(12) United States Patent
Jojiki

(10) Patent No.: US 7,283,300 B2
(45) Date of Patent: Oct. 16, 2007

(54) MAGNIFYING BINOCULARS

(75) Inventor: Masao Jojiki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/463,041

(22) Filed: Aug. 8, 2006

(65) Prior Publication Data

US 2007/0035825 A1 Feb. 15, 2007

(30) Foreign Application Priority Data

Aug. 8, 2005 (JP) .......................... P2005-229932

(51) Int. Cl.
  G02B 23/00 (2006.01)
  G02B 27/02 (2006.01)
  G02C 9/00 (2006.01)
(52) U.S. Cl. .................. 359/429; 359/407; 359/482; 351/57; 351/158
(58) Field of Classification Search ........ 359/405–430, 359/480–482, 362, 431; 351/158, 57
See application file for complete search history.

(56) References Cited

U.S. PATENT DOCUMENTS

| | | | | |
|---|---|---|---|---|
| 4,795,235 | A | | 1/1989 | Spitzberg .................... 359/404 |
| 5,028,127 | A | | 7/1991 | Spitzberg .................... 351/158 |
| 5,323,190 | A | * | 6/1994 | Onufryk ..................... 351/158 |
| 5,579,158 | A | * | 11/1996 | Padula ........................ 359/482 |
| 5,966,239 | A | | 10/1999 | Shirayanagi et al. ........ 359/481 |
| 6,120,145 | A | * | 9/2000 | Lyst et al. .................. 351/158 |
| 6,155,682 | A | * | 12/2000 | Steinberg et al. ............ 351/205 |
| 6,830,331 | B2 | | 12/2004 | Jojiki et al. .................... 351/57 |
| 6,921,167 | B2 | | 7/2005 | Nagata ........................ 351/158 |
| 2004/0190136 | A1 | | 9/2004 | Kanai ......................... 359/407 |

FOREIGN PATENT DOCUMENTS

| | | |
|---|---|---|
| JP | 9-262210 | 10/1997 |
| JP | 2003-195185 | 7/2003 |
| JP | 2005-128305 | 5/2005 |

OTHER PUBLICATIONS

English language Abstract of JP 2005-128035.
English language Abstract of JP 2003-195185.

* cited by examiner

*Primary Examiner*—Thong Q Nguyen
(74) *Attorney, Agent, or Firm*—Greenblum & Bernstein, P.L.C.

(57) ABSTRACT

Magnifying binoculars configured for observing a magnified image of an object, includes a frame configured to be worn by a user, a pair of magnifying optical system units provided for left and right eyes of the user, respectively, each of the magnifying optical system units including a magnifying optical system for observing the magnified image of the object, and an optical path switching unit provided on an object side of each of the magnifying optical system units, the optical path switching unit including a movable mirror and a fixed mirror. The movable mirror is configured to be moved between an operating position on an optical path on the object side of the magnifying optical system unit and an evacuated position off the optical path. The fixed mirror is configured to deflect the optical path deflected by the movable mirror when the movable mirror is located on the operating position.

15 Claims, 11 Drawing Sheets

MAGNIFYING BINOCULARS

BACKGROUND OF THE INVENTION

The present invention relates to magnifying binoculars for binocularly observing a magnified image of an object.

In an operation to treat a microscopic tissue such as a brain surgery and a cardiovascular surgery, a doctor performs the operation observing a portion to be treated as magnified with a magnifying glass. In such a case, it is desirable to use magnifying binoculars so as to three-dimensionally observe the portion to be treated. In Japanese Patent Provisional Publication No. 2005-128305, there are disclosed magnifying binoculars that are configured with magnifying optical system units attached to apertures that are formed at center portions of right and left lenses of eyeglasses, respectively. The magnifying optical system unit is provided with a real-image-type magnifying optical system configured with an objective lens and an eyepiece, and a roof prism arranged between the objective lens and eyepiece. The roof prism has a function of erecting an image formed by the objective optical system, and deflecting an optical path such that a user wearing the magnifying binoculars can observe a region at the user's hands when facing front.

Thereby, the doctor can observe the magnified portion to be treated without cocking the doctor's head ahead, so as to prevent fatigue of the neck caused by long hours of operation.

However, the magnifying binoculars disclosed in Japanese Patent Provisional Publication No. 2005-128305 enable observation of a magnified image of the object only in a deflected direction, but do not allow the observation of the magnified image of the object in the other directions keeping the same posture.

SUMMARY OF THE INVENTION

The present invention is advantageous in that there can be provided improved magnifying binoculars that can allow a user to observe a magnified image of an object in a plurality of directions even though the user wearing the magnifying binoculars does not change the user's posture.

According to an aspect of the present invention, there are provided magnifying binoculars configured for observing a magnified image of an object, which includes: a frame configured to be worn by a user; a pair of magnifying optical system units provided for left and right eyes of the user, respectively, each of the magnifying optical system units including a magnifying optical system for observing the magnified image of the object; and an optical path switching unit provided on an object side of each of the magnifying optical system units, the optical path switching unit including a movable mirror and a fixed mirror. The movable mirror is configured to be moved between an operating position on an optical path on the object side of the magnifying optical system unit and an evacuated position off the optical path. The fixed mirror is configured to deflect the optical path deflected by the movable mirror when the movable mirror is located on the operating position.

Optionally, the magnifying optical system may include an objective lens with a positive power and an eyepiece with a positive power. Optionally, the magnifying optical system unit may include an erecting prism arranged between the objective lens and eyepiece for erecting an image formed by the objective lens.

Still optionally, the erecting prism may be configured to deflect the optical path such that the user, facing front, can observe the object at user's hands. Optionally, the movable mirror may be configured to be moved between the operating position on the optical path deflected by the erecting prism on the object side of the magnifying optical system unit and the evacuated position off the optical path. In this case, the fixed mirror may be configured to deflect the optical path deflected by the movable mirror such that the optical path on the object side conforms to a visual line direction of the user, when the movable mirror is located on the operating position.

Alternatively, or optionally, the erecting prism may be configured to erect the image such that the optical path substantially conforms between the front and rear of the erecting prism. Optionally, the movable mirror may be configured to be moved between the operating position on the optical path on the object side of the magnifying optical system unit and the evacuated position off the optical path. In this case, the fixed mirror may be configured to deflect the optical path deflected by the movable mirror such that the optical path on the object side is deflected in a predetermined direction, when the movable mirror is located on the operating position.

Optionally, the optical path switching unit may be attached detachably to the magnifying optical system unit.

Optionally, the magnifying optical system unit may be attached to each of left and right eyeglass lenses fixed to the frame.

Alternatively or optionally, the magnifying optical system unit may be attached to the frame through a supporting member fixed to the frame.

Alternatively or optionally, the frame may be configured as a head band wearable by a head of the user. Optionally, the magnifying optical system unit may be attached to the head band through a supporting member fixed to the head band.

Optionally, the optical path switching unit may include a fixed frame that is fixed to the magnifying optical system unit, a movable frame that is attached to the fixed frame rotatably around a horizontal rotation axis, the movable frame being formed with a knob with which the user operate the movable frame to rotate, and a locating system configured to set a position of the movable mirror at one of the operating position and the evacuated position. Optionally, the fixed mirror may be provided at the fixed frame, and the movable mirror is provided at the movable frame.

Further optionally, the locating system may be configured with an iron piece attached to one of the movable frame and the fixed frame, and a permanent magnet attached to the other.

According to another aspect of the present invention, there are provided magnifying binoculars configured for observing a magnified image of an object, which includes: an eyeglass frame; left and right eyeglass lenses fitted in the eyeglass frame; left and right magnifying optical system units for magnifying and observing the object fixed to the left and right eyeglass lenses, respectively, each of the magnifying optical system units including a magnifying optical system for observing the magnified image of the object and a deflecting member configured to deflect an optical path such that a user wearing the magnifying binoculars can observe the object at user's hands when facing front; and an optical path switching unit provided on an object side of each of the magnifying optical system units, including a movable mirror and a fixed mirror. The movable mirror is configured to be moved between an operating position on an optical path deflected by the deflecting member on the object side of the magnifying optical system unit and an evacuated position off the optical path. The fixed mirror is configured to deflect the optical path deflected by the movable mirror such that the optical path on the object side substantially conforms to a visual line direction of the user, when the movable mirror is located on the operating position.

Optionally, the magnifying optical system may include an objective lens with a positive power and an eyepiece with a positive power. Optionally, the deflecting member may include a roof prism for erecting an image formed by the objective lens that is arranged between the objective lens and eyepiece.

According to a further aspect of the present invention, there are provided magnifying binoculars configured for observing a magnified image of an object, which includes: a wearable frame; a pair of magnifying optical system units, provided for left and right eyes of a user, respectively, for observing the magnified image of the object; and an optical path switching unit provided on an object side of each of the magnifying optical system units, the optical path switching unit being configured to switch the optical path between a first state where the optical path is deflected such that the user, facing front, can observe the object at user's hands and a second state where the optical path on the object side substantially conforms to a visual line direction of the user.

Optionally, each of the magnifying optical system units may include a magnifying optical system configured to produce the magnified image of the object. Optionally, the optical path switching unit may include a movable mirror and a fixed mirror. Optionally, the movable mirror may be configured to be moved between an operating position on an optical path on the object side of the magnifying optical system unit and an evacuated position off the optical path. In this case, the fixed mirror may be configured to deflect the optical path deflected by the movable mirror, when the movable mirror is located on the operating position.

According to a further aspect of the present invention, there are provided magnifying binoculars configured for observing a magnified image of an object, which includes: a wearable frame; a pair of magnifying optical system units provided for left and right eyes of the users respectively; and an optical path switching unit provided on an object side each of the magnifying optical system units, the optical path switching unit being configured to switch the optical path between: (a) a first state where light from the object at a position off a visual line direction of the user is incident on each of the pair of magnifying optical system units; and (b) a second state where the light from the object at a position on the visual line direction of the user is incident on each of the pair of magnifying optical system units.

BRIEF DESCRIPTION OF THE ACCOMPANYING DRAWINGS

DETAILED DESCRIPTION OF THE EMBODIMENTS

Hereinafter, four embodiments of magnifying binoculars according to the present invention will be explained with reference to the accompanying drawings.

First Embodiment

Figure 1:
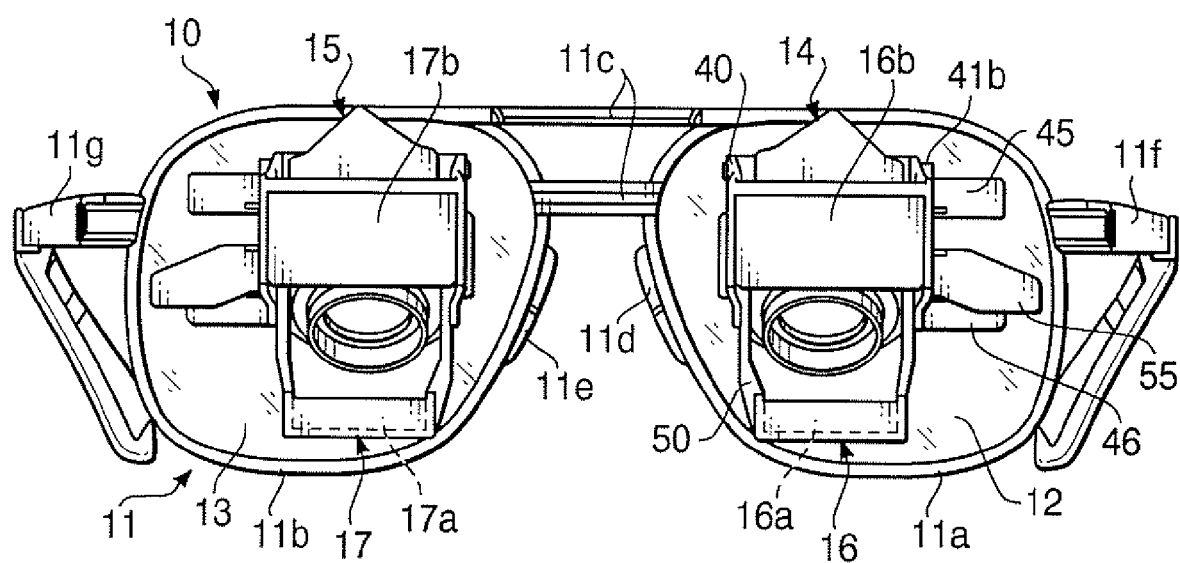
FIG. 1 is a front view of magnifying binoculars according to a first embodiment of the present invention.
Figure 2:
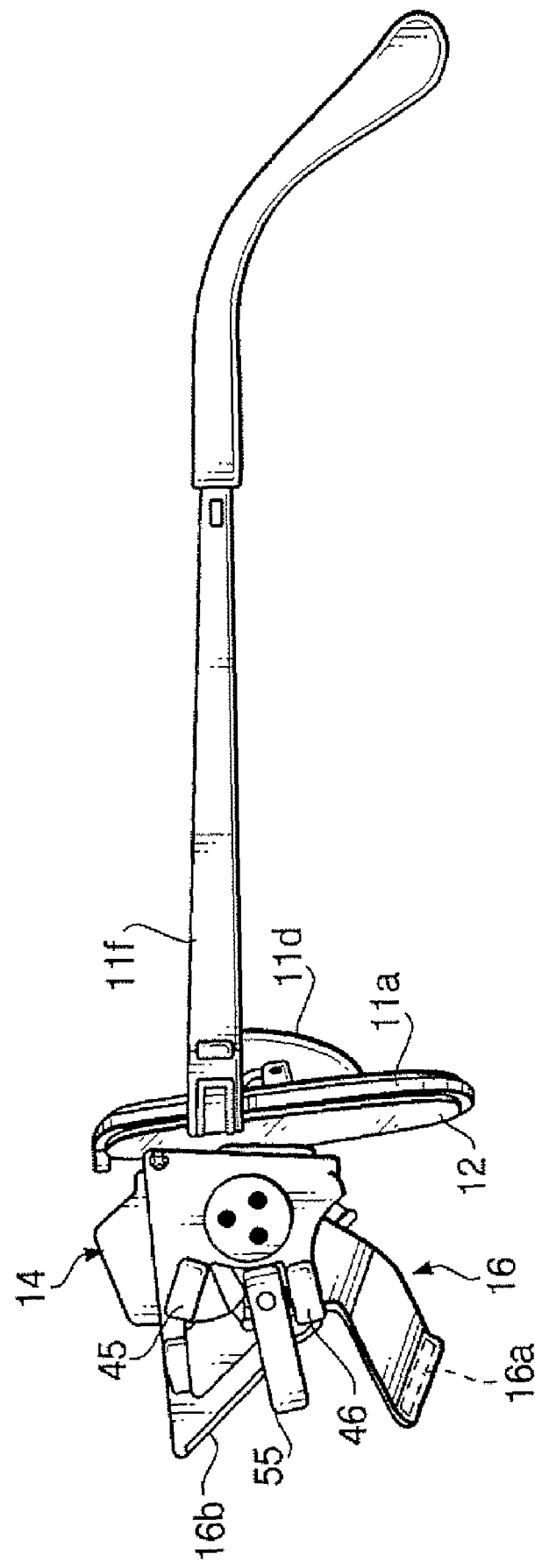
FIG. 2 is a side view of the magnifying binoculars according to the first embodiment of the present invention.
Figure 3:
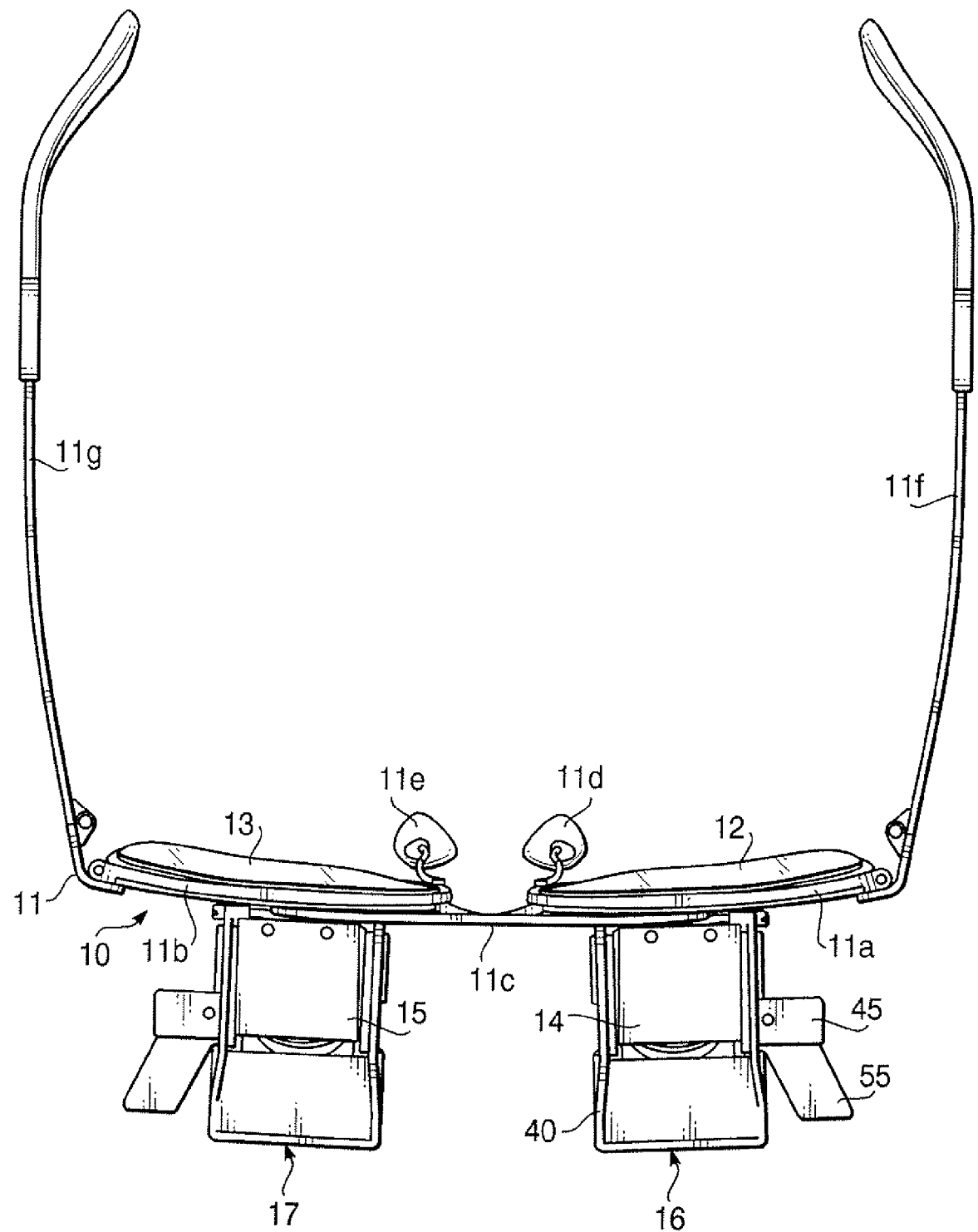
FIG. 3 is a top view of the magnifying binoculars according to the first embodiment of the present invention.

FIG. 1 is a front view of magnifying binoculars according to a first embodiment of the present invention. FIG. 2 is a side view of the magnifying binoculars according to the first embodiment. FIG. 3 is a top view of the magnifying binoculars according to the first embodiment.

Figure 5:
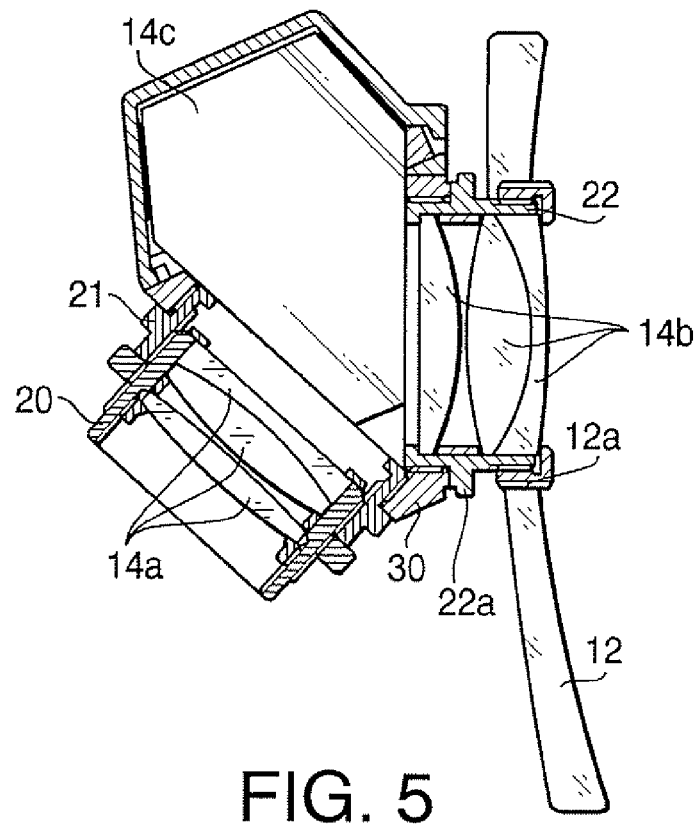
FIG. 5 is a cross-sectional side view of a magnifying optical system unit of the magnifying binoculars according to the first embodiment of the present invention.

As shown in FIGS. 1-3, the magnifying binoculars 10 according to the first embodiment are configured with left and right lenses 12 and 13 of eyeglasses being fixed to an eyeglass frame 11, an aperture being formed as a through hole conforming to a position of a user's pupil at a center portion of each of the eyeglass lenses 12 and 13 (the aperture of the left lens 12 is indicated with a reference sign 12a in FIG. 5), left and right magnifying optical system units 14 and 15 for observing a magnified image of an object being bonded to the apertures, respectively, and further optical path switching units 16 and 17, which include movable mirrors 16a and 17a and fixed mirrors 16b and 17b, respectively, being attached at object sides of the magnifying optical system units 14 and 15, respectively.

The eyeglass frame 11 is configured with rims 11a and 11b holding the eyeglass lenses 12 and 13, respectively, a bridge 11c connecting the left and right rims 11a and 11b, nose pads 11d and 11e arranged at inward sides of the rims 11a and 11b, and temples 11f and 11g to be hung on ears at outward sides of the rims 11a and 11b, respectively.

Next, the aforementioned optical system of the magnifying binoculars 10, magnifying optical system unit 14, optical path switching unit 16 will sequentially be explained. It is noted that the following explanations will be made as examples as to the optical system, magnifying optical system unit, and optical path switching unit for the left eye. The optical system, magnifying optical system unit, and optical path switching unit for the right eye have the same configurations as mirror reversed configurations of those for the left eyes, respectively. Therefore, redundant explanations about them will be omitted for brevity.

Figure 4:
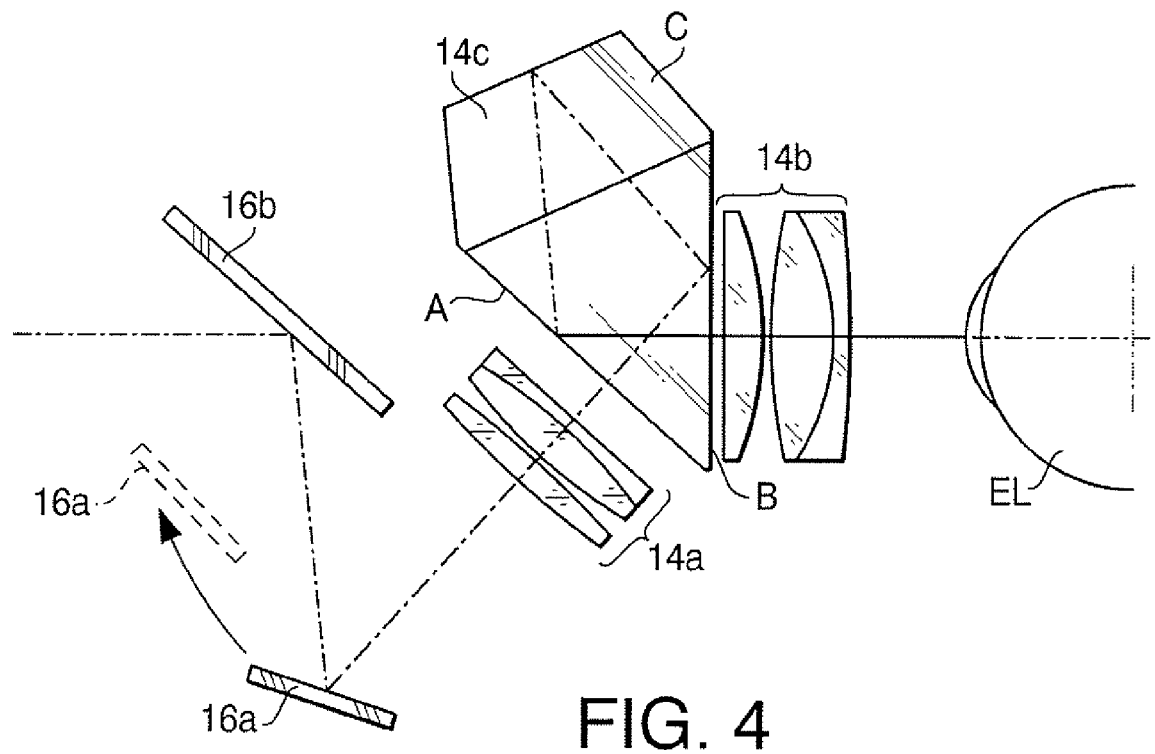
FIG. 4 is a side view of an optical system extracted from the magnifying binoculars according to the first embodiment of the present invention.

FIG. 4 is a side view of an optical system only extracted from the magnifying binoculars 10 according to the first embodiment. The optical system of the magnifying optical system unit 14, as shown in FIG. 4, is configured with a real-image-type magnifying optical system provided with an objective lens 14a of a positive power and an eyepiece 14b of a positive power to view the magnified image of the object, and a roof prism 14c as a deflecting member, arranged between the objective lens 14a and the eyepiece 14b, for deflecting the optical path of the magnifying optical system in a single direction and erecting an image. The movable mirror 16a of the optical path switching unit 16 is configured to be moved between an operating position (shown by a solid line) on an object side on the optical path deflected by the roof prism 14c and an evacuated position (shown by a dashed line) off the optical path. Further, the fixed mirror 16b is located above the movable mirror 16a. When the movable mirror 16a is arranged on the operating position, the optical path deflected by the movable mirror 16a is further deflected by the fixed mirror 16b, so that the optical path on the object side conforms to a direction of a visual line of the user wearing the magnifying binoculars.

In a state of viewing with the optical path being deflected by the movable mirror 16a located on the evacuated position, light from the object to be observed is incident onto the objective lens 14a without being deflected by the fixed mirror 16b or the movable mirror 16a. Then, the light is transmitted through a first surface A of the roof prism 14c from the objective lens 14a, and is totally reflected by a second surface B of the roof prism 14c to be reflected by a Dach surface C of the roof prism 14c. Thereafter, the light is totally reflected by the first surface A, and is transmitted through the second surface B to reach the left eye EL of the user through the eyepiece 14b. In the state of viewing with the optical path being deflected, the user wearing the magnifying binoculars can observe the object at the user's hands while facing front.

In the meantime, in a straight viewing state with the movable mirror 16a being located on the operating position, the light from the object to be observed is incident onto the objective lens 14a after being reflected sequentially by the fixed mirror 16b and the movable mirror 16a. Subsequently, the light reaches the left eye EL of the user wearing the magnifying binoculars via the eyepiece 14b. In the straight viewing state, the user wearing the magnifying binoculars can observe the magnified image of the object in the visual line direction.

Next, mechanical configurations of the magnifying optical system unit 14 and optical path switching unit 16 will be explained. FIG. 5 is a cross-sectional side view of the magnifying optical system unit 14 of the magnifying binoculars 10 according to the first embodiment. The objective lens 14a of the magnifying optical system unit 14, as shown in FIG. 5, is incorporated in an objective lens barrel 20. The objective lens barrel 20 is screwed together with an auxiliary lens barrel 21. The auxiliary lens barrel 21 is screwed together with a housing 30 in which the roof prism 14c is incorporated. In addition, the eyepiece 14b is incorporated in an eyepiece lens barrel 22, and the eyepiece lens barrel 22 is screwed together with the housing 30. Thus, the objective lens barrel 20, auxiliary lens barrel 21, housing 30, and eyepiece lens barrel 22, integrally assembled, are fixed to the eyeglass lens 12 with the eyepiece lens barrel 22 being bonded with the eyeglass lens 12. Further, on an outer circumferential surface of the eyepiece lens barrel 22, there is formed a flange 22a protruded outward.

Figure 6:
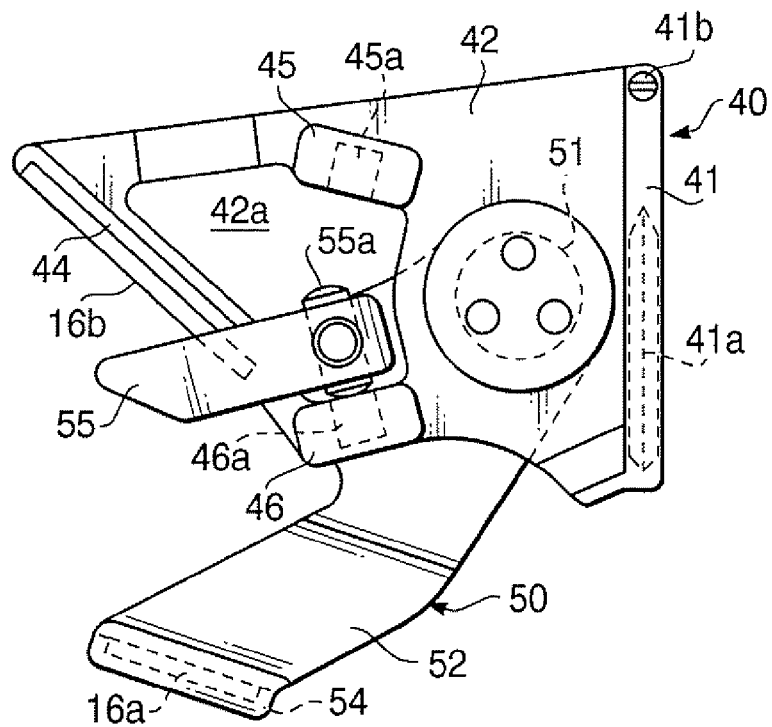
FIG. 6 is a side view of an optical path switching unit of the magnifying binoculars according to the first embodiment of the present invention.
Figure 7:
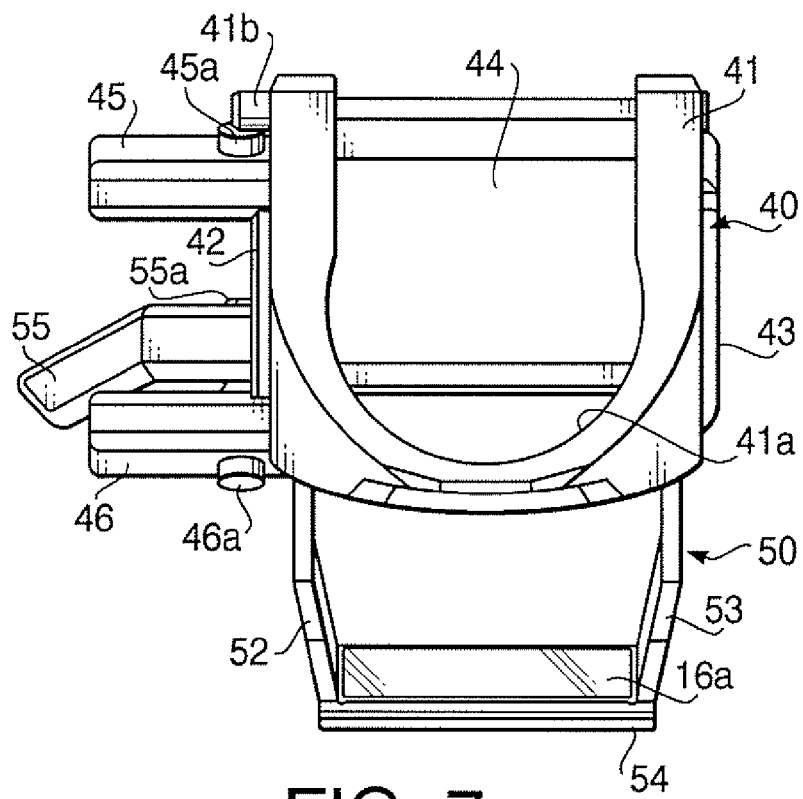
FIG. 7 is a back view of the optical path switching unit of the magnifying binoculars, as viewed from an eye side of a user wearing the magnifying binoculars, according to the first embodiment of the present invention.

Meanwhile, the optical path switching unit 16, as shown in FIGS. 6 and 7, is provided with a fixed frame 40 attached to the eyeglass lens 12 via the eyepiece lens barrel 22, and a movable frame 50 attached rotatably around a rotation axis (rotating shaft 51) in a horizontal direction to the fixed frame 40. Here, FIG. 6 is a side view of the optical path switching unit 16 of the magnifying binoculars 10 according to the first embodiment. FIG. 7 is a back view of the optical path switching unit 16 of the magnifying binoculars 10 according to the first embodiment, as viewed from an eye side of the user wearing the magnifying binoculars. The fixed frame 40, as shown in FIG. 7, is provided with a U-shaped rear frame portion 41 including an arc-groove-shaped engaging portion 41a that engages with the flange 22a (see FIG. 5) of the eyepiece lens barrel 22 at a rear side as a side of the eye. The fixed frame 40 is further provided with left and right side walls 42 and 43 extending forward from the rear frame portion 41, and a front wall 44, bridged between the front ends of the side walls 42 and 43 and holding the fixed mirror 16b. It is noted that a long screw 41b for tightening an open side of the frame portion is screwed together with an upper end of the rear frame portion 41. Namely, on a left side surface of the rear frame portion 41, there is formed a sleeve through which the long screw 41b passes, and, on a right side surface thereof, there is formed a screw sleeve with which the long screw 41b is screwed together.

In addition, the movable frame 50 is provided with left and right arms 52 and 53 that are attached rotatably to inner surfaces of the left and right side walls 42 and 43 of the fixed frame 40 via a rotating shaft 51, respectively, and a mirror holding portion 54, which is bridged between end portions of both of the arms 52 and 53, holding the movable mirror 16a.

On the left side wall 42 of the fixed frame 40, there is formed an opening 42a, and first and second locating portions 45 and 46 are fixed on a circumferential surface along a rotational direction of the movable frame 50, sandwiching the opening 42a. On the other hand, at the left arm 52 of the movable frame 50, there is formed a knob 55 protruding left via the opening 42a of the fixed frame 40. Iron attracted rod 55a is fixed to the knob 55, passing through the knob 55. Each of the first and second locating portions 45 and 46 includes a permanent magnet 45a or 46a embedded therein for attracting the attracted rod 55a when the knob 55 rotates to a corresponding one of the locating portions 45 and 46.

When attaching the optical path switching unit 16 to the magnifying optical system unit 14, the long screw 41b is slackened to open an opening side of the rear frame portion 41. Then, the groove of the engaging portion 41a is fitted on the flange 22a of the eyepiece lens barrel 22 (see FIG. 5), and thereafter, the long screw 41b is lightly fastened to adjust convergence in conformity with eye width of the user. After the adjustment of the convergence, the long screw 41b is tightly fastened to be fixed. In the state where the long screw 41b is lightly driven in, the optical path switching unit 16 can rotate around the eyepiece lens barrel 22. In such a state, the user wears the magnifying binoculars, setting the movable mirror 16a on the operating position, and rotates and adjusts the left and right optical path switching units 16 and 17 using a convergence adjustment cross chart that is generally used when adjusting the convergence.

Figure 8:
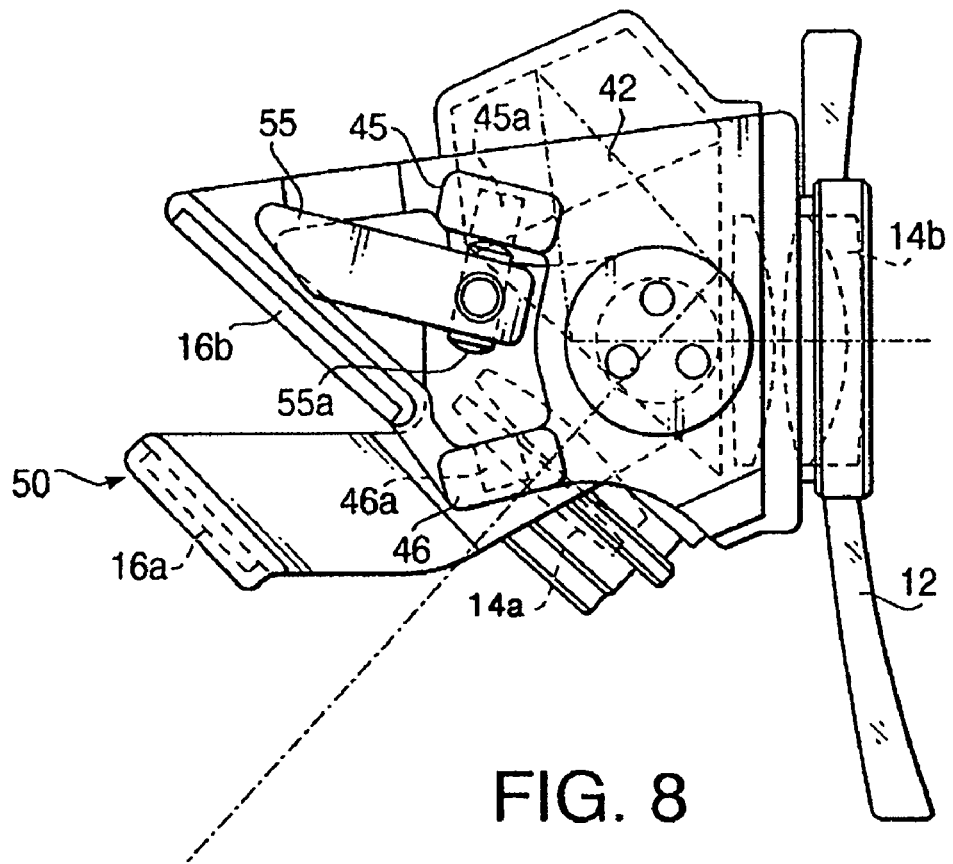
FIG. 8 is a side view of the magnifying binoculars, showing a state of viewing with the optical path being deflected, according to the first embodiment of the present invention.

When observing an area at the user's hands in actual use of the magnifying binoculars in the operation, the user takes a lower surface of the knob 55 and an upper surface of the first locating portion 45 between the user's fingers to lift the knob 55 upward. Thereby, the movable arm 50 is rotated clockwise in FIG. 6, and the attracted rod 55a is attracted by the permanent magnet 45a of the first locating portion 45 to fix the movable frame 50 and hold the movable mirror 16a on the evacuated position (in the state of viewing with the optical path being deflected), as shown in FIG. 8. Thereby, the optical path on the object side is deflected by 48 degrees with respect to the visual line, so that the user, facing front, can observe a magnified operative site at the user's hands. For this reason, it is possible to reduce fatigue of a neck of the user. It is noted that FIG. 8 is a side view of the magnifying binoculars 10 according to the first embodiment, showing a state of viewing with the optical path being deflected.

Figure 9:
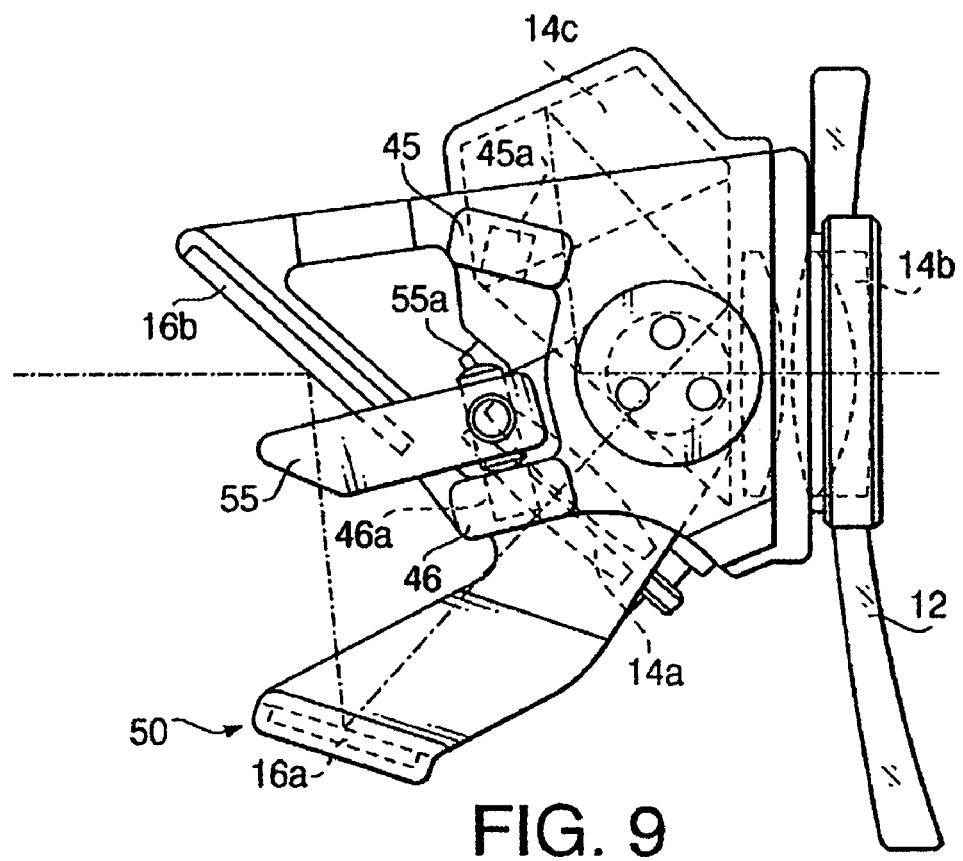
FIG. 9 is a side view of the magnifying binoculars, showing a straight viewing state, according to the first embodiment of the present invention.

Meanwhile, when the user has to check the object in the straight viewing state, the user takes the upper surface of the knob 55 and the lower surface of the second locating portion 46 between the user's fingers, and brings down the knob 55. Thereby, the movable frame 50 is rotated counterclockwise in FIG. 6, and the attracted rod 55a is attracted by the permanent magnet 46a of the second locating portion 46 to locate the movable arm 50 and hold the movable mirror 16a on the operating position (in the straight viewing state), as shown in FIG. 9. Thereby, the optical path on the object side substantially conforms to the visual line, so that the user can observe the magnified image of the object in the visual line direction. It is noted that FIG. 9 is a side view of the magnifying binoculars 10 according to the first embodiment, showing the straight viewing state.

Therefore, according to the magnifying binoculars in the first embodiment, by switching the position of the movable mirrors 16a and 17a between the evacuated position and the operating position, it is possible to view the magnified image of the object in both of the state of the optical path being deflected where the optical path is deflected with respect to the visual line and the straight viewing state where the optical path substantially conforms to the visual line. Hence, for example, in a cardiovascular surgery, each of the movable mirrors 16a and 17a is set on the evacuated position when suturing coronary arteries. In the meantime, each of the movable mirrors 16a and 17a is set on the operating position when viewing a backside of a heart, which is lifted, for confirmation. Thus, it is allowed to rapidly change the observing direction, so that an operation time period can be shortened.

Second Embodiment

Figure 10:
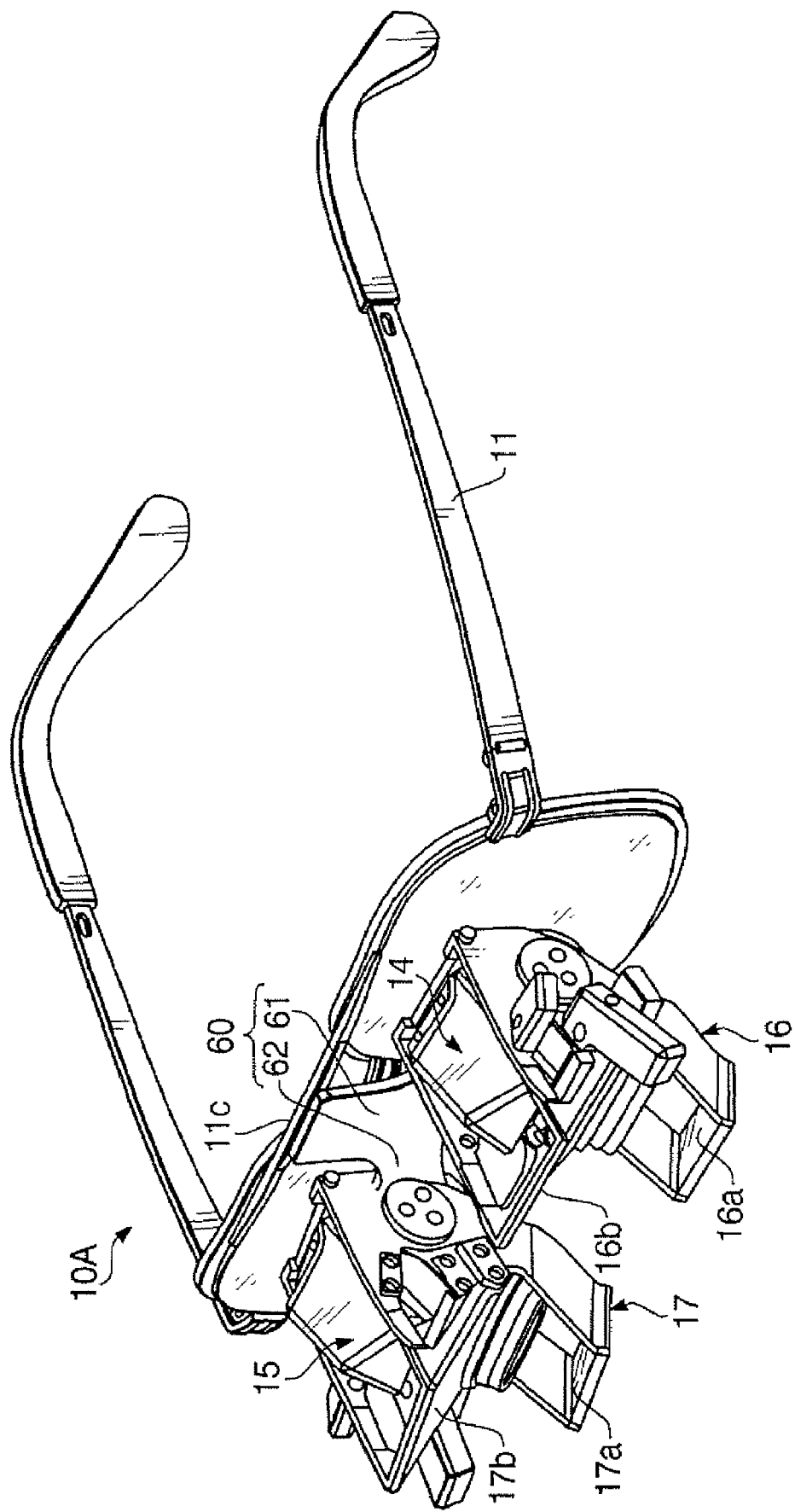
FIG. 10 is a perspective view of magnifying binoculars according to a second embodiment of the present invention.

Next, magnifying binoculars according to a second embodiment will be explained with reference to the accompanying drawings. FIG. 10 is a perspective view of magnifying binoculars 10A according to a second embodiment.

The magnifying binoculars 10A according to the second embodiment 2 are configured with left and right magnifying optical system units 14 and 15 being attached to a eyeglass frame 11 through a supporting member 60, and further, optical path switching units 16 and 17, each of which includes a movable mirror 16a or 17a and a fixed mirror 16b or 17b, being attached detachably to the object sides of the magnifying optical system units 14 and 15, respectively.

The supporting member 60 is a T-shaped plate-like member configured with a longitudinal frame 61 fixed to a bridge 11c of the eyeglass frame 11, and a transverse frame 62 fixed to a lower end of the longitudinal frame. Each of the magnifying optical system units 14 and 15 is attached to a corresponding one of distal ends of the transverse frame 62.

Figure 11:
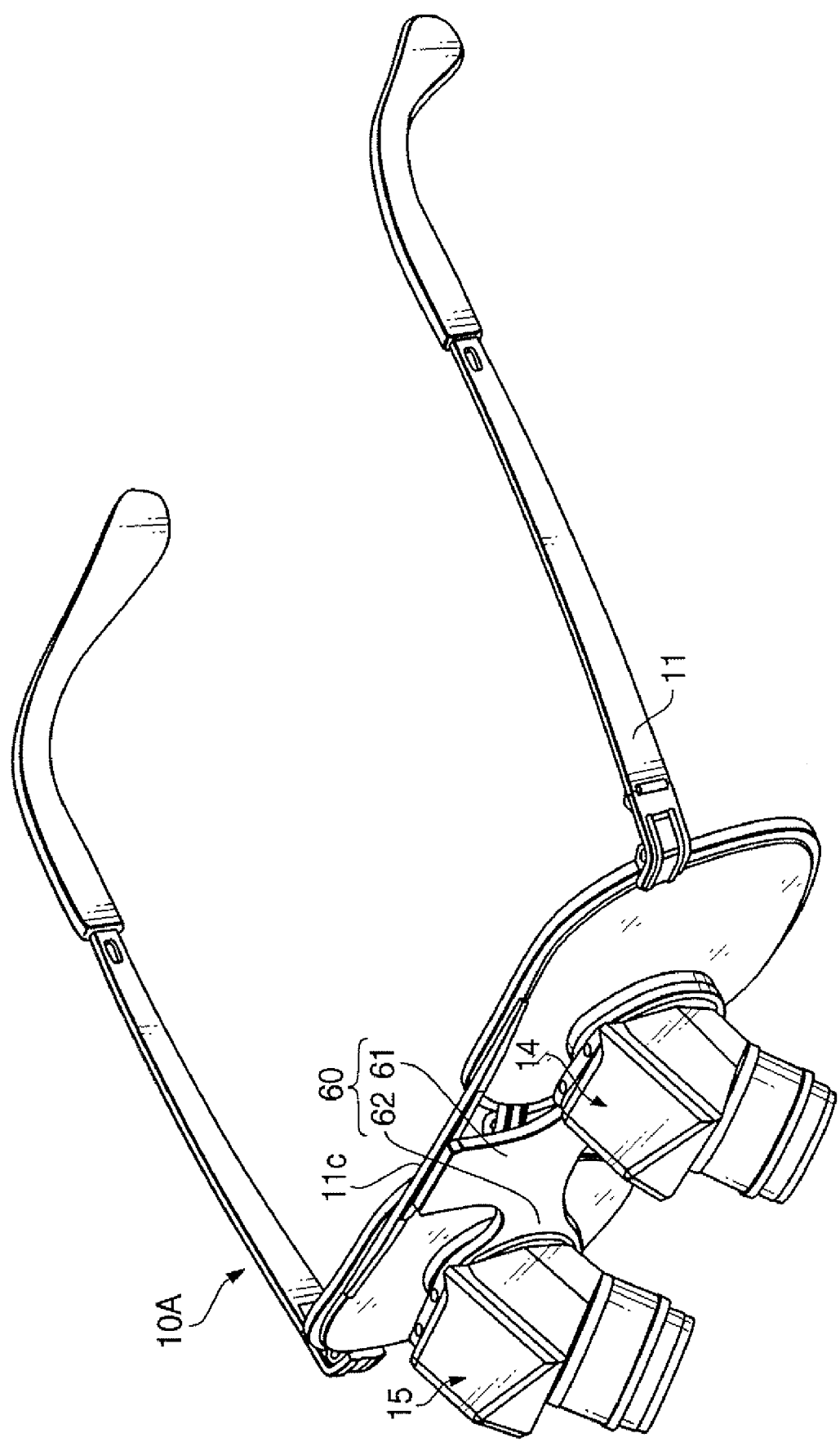
FIG. 11 is a perspective view of the magnifying binoculars with the optical path switching units being removed therefrom according to the second embodiment of the present invention.

Configurations of the magnifying optical system units 14 and 15, and those of the optical path switching units 16 and 17 are the same as the configurations according to the first embodiment. It is noted that the optical path switching units 16 and 17 are attached detachably to the magnifying optical system units 14 and 15, respectively. In the case where the observation with the straight viewing is unnecessary, as shown in FIG. 11, the magnifying binoculars can be used with the optical path switching units 16 and 17 being removed therefrom, and it makes the magnifying binoculars so lighter that a load applied to the user can be reduced.

Third Embodiment

Figure 12:
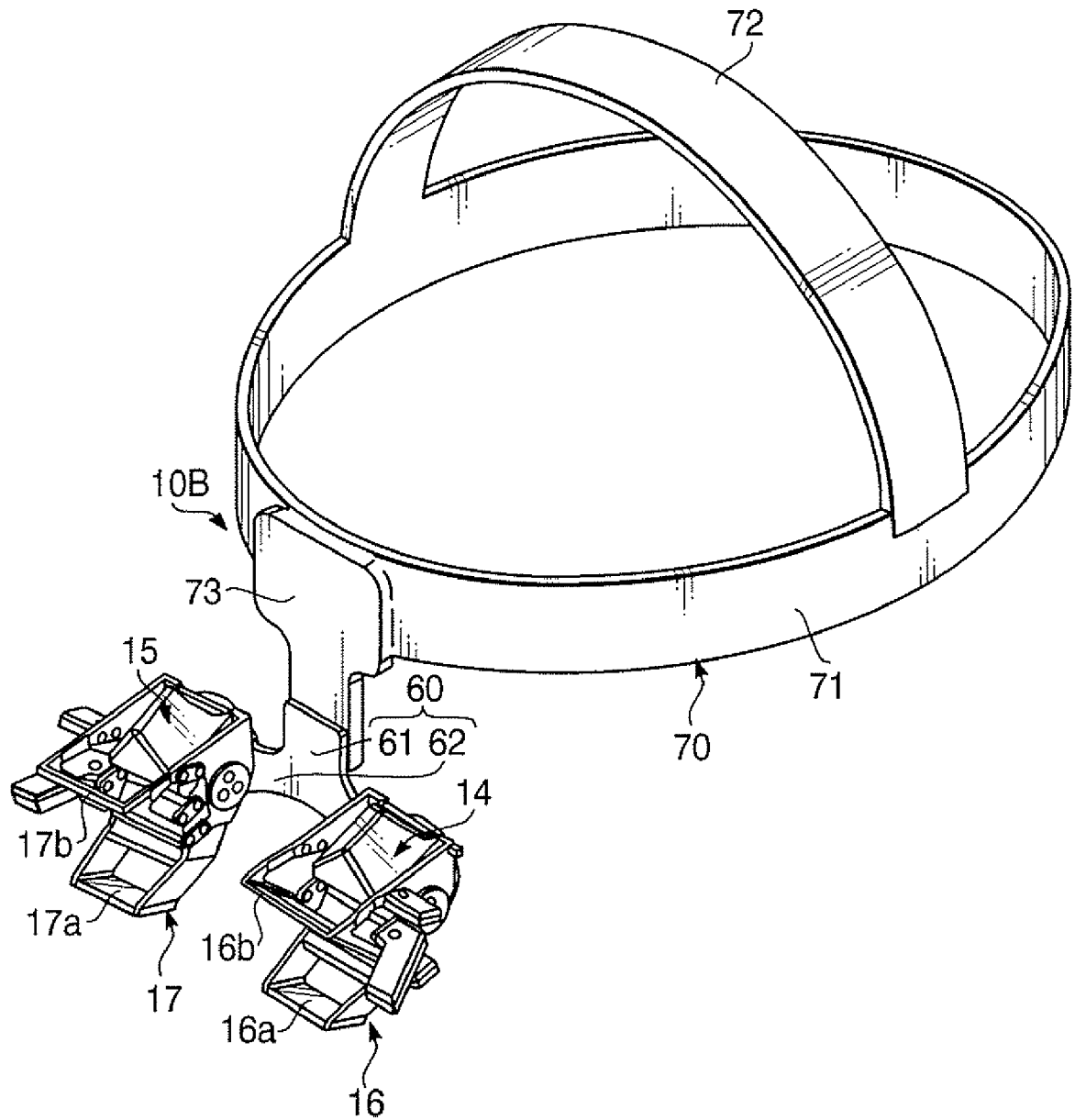
FIG. 12 is a perspective view of magnifying binoculars according to a third embodiment of the present invention.

Next, magnifying binoculars according to a third embodiment will be explained with reference to the accompanying drawings. FIG. 12 is a perspective view of magnifying binoculars 10B according to a third embodiment.

The magnifying binoculars 10B according to the third embodiment are configured with left and right magnifying optical system units 14 and 15 being attached to a head band 70 to be worn on a head of the user through a supporting member 60 similar to that in the second embodiment, and further, optical path switching units 16 and 17, each of which includes a movable mirrors 16a or 17a, and a fixed mirror 16b or 17b, being attached detachably to the object sides of the magnifying optical system units 14 and 15, respectively.

The head band 70 is provided with an annular ring shaped band portion 71 to surround the head of the user, a half annular ring shaped overhead portion 72 formed integrally with the band portion 71 so as to pass over the head, and an attaching portion 73 extending downward from a front portion of the band portion 71. The supporting member 60 is fixed to a lower portion of the attaching portion 73.

The supporting member 60 is a T-shaped plate-like member configured with a longitudinal frame 61 fixed to the lower portion of the attaching portion 73, and a transverse frame 62 fixed to a lower end of the longitudinal frame.

Figure 13:
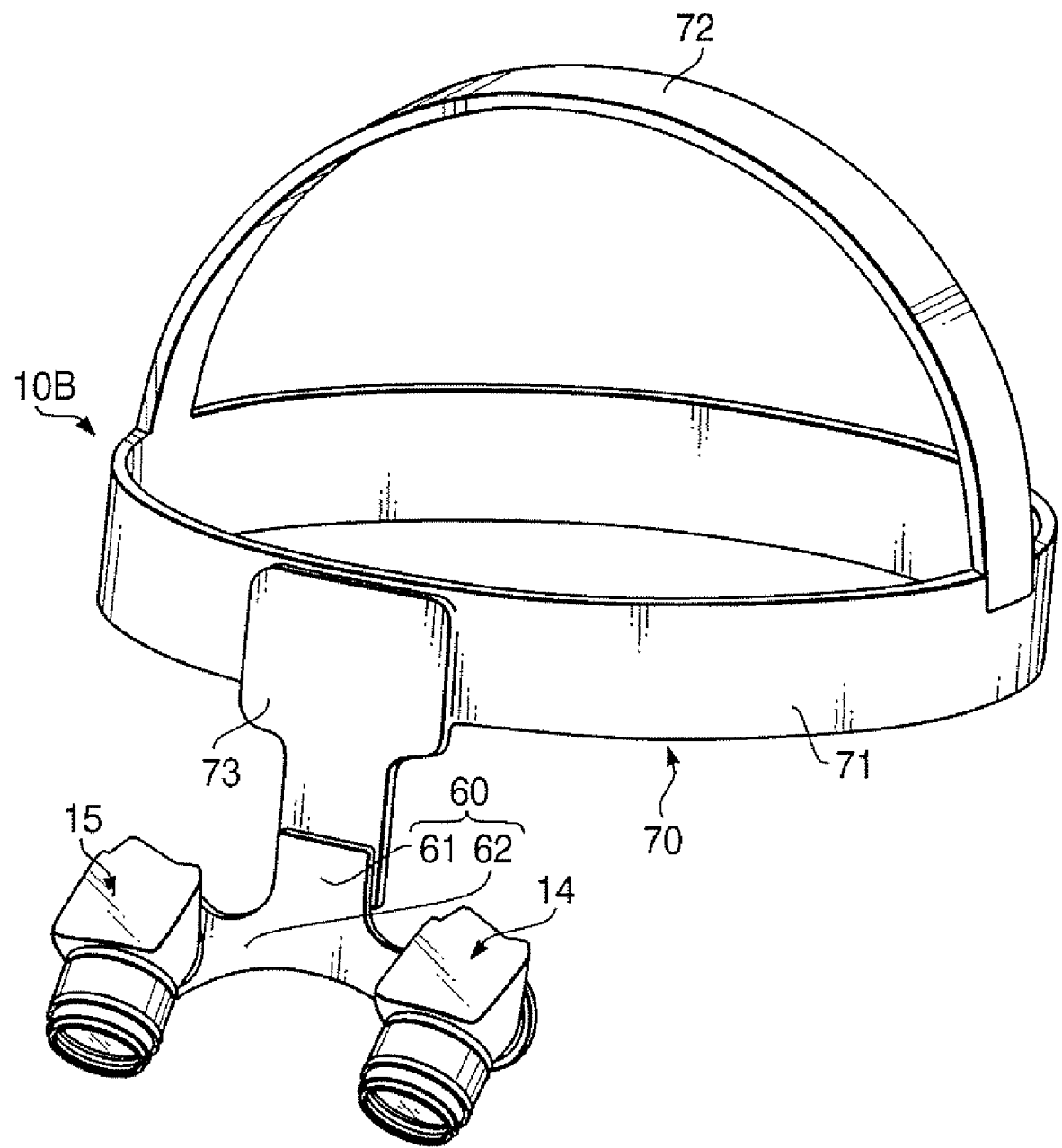
FIG. 13 is a perspective view of the magnifying binoculars with the optical path switching units being removed therefrom according to the third embodiment of the present invention.

Configurations of the magnifying optical system units 14 and 15, and those of the optical path switching units 16 and 17 are the same as the configurations according to the first embodiment. It is noted that the optical path hanging units 16 and 17 are attached detachably to the magnifying optical system units 14 and 15, respectively. In the case where the observation with the straight viewing is unnecessary, as shown in FIG. 13, the magnifying binoculars can be used with the optical path switching units 16 and 17 being removed therefrom, and it makes the magnifying binoculars so lighter that a load applied to the user can be saved.

Fourth Embodiment

Figure 14:
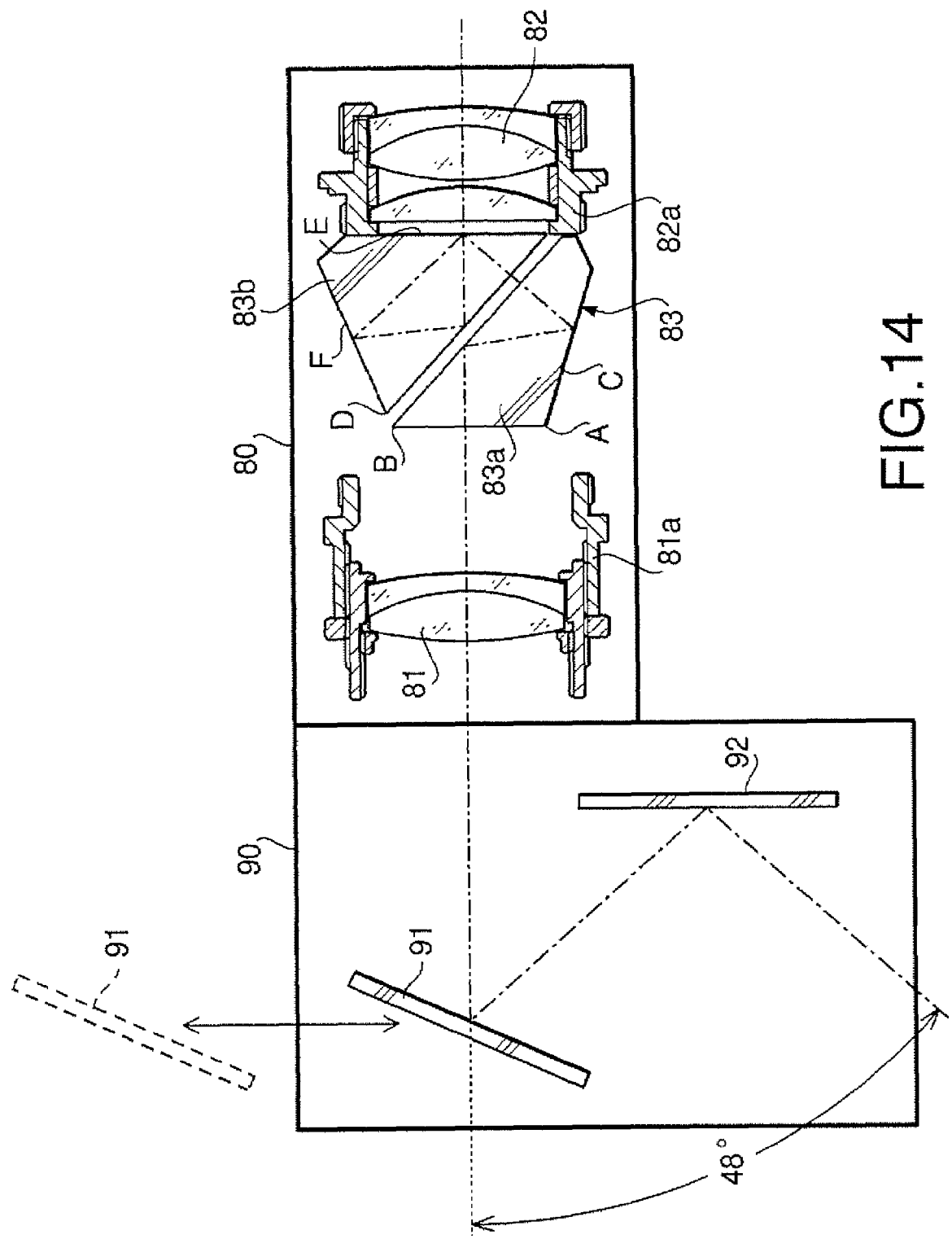
FIG. 14 is a side view of an optical system for a left eye of magnifying binoculars according to a fourth embodiment of the present invention.

Next, magnifying binoculars according to a fourth embodiment will be described with reference to the accompanying drawing. FIG. 14 is a side view of an optical system for the left eye of magnifying binoculars according to a fourth embodiment. The optical system of the magnifying binoculars according to the fourth embodiment is configured with a magnifying optical system unit 80, and an optical path switching unit 90. The magnifying optical system unit 80 is configured with a real-image-type magnifying optical system for observing the magnified image of the object provided with an objective lens 81 with a positive power and an eyepiece 82 with a positive power, and an erecting prism 83 for erecting an image arranged between the objective lens 81 and the eyepiece lens 82. It is noted that the objective lens 81 and eyepiece lens 82 are housed in an objective lens barrel 81*a* and an eyepiece lens barrel 82*a*, respectively.

In the fourth embodiment, a direct vision prism, which erects the image without the optical path being deflected between the front and rear of the prism (namely, with the optical path direction conforming between the front and rear of the prism), is employed as the erecting prism 83. The erecting prism 83 is configured with a first prism (a Pechan prism) 83*a* and a second prism (a Schmidt prism or a roof prism) 83*b* being arranged opposite each other at a short distance therebetween.

The optical path switching unit 90 is provided with a movable mirror 91 configured to be moved between an operating position (shown by a solid line) on the optical path at an object side and an evacuated position (shown by a dashed line) off the optical path, and a fixed mirror that further deflects the optical path deflected by the movable mirror 91 when the movable mirror 91 is located on the operating position to direct the optical path on the object side to an area at the user's hands.

In the straight viewing state where the movable mirror 91 is located on the evacuated position, the light from the object to be observed is incident onto the objective lens 81 without being deflected by the fixed mirror 92 or the movable mirror 91. Then, the light is transmitted through a first surface A of the first prism 83*a*, and is totally reflected by a second surface B thereof to be reflected by a third surface C on which aluminum is deposited. Then, after being transmitted through the second surface B, the light is incident onto a first surface D of the second prism 83*b*, and is totally reflected by a second surface E thereof to be reflected by a Dach surface F. Thereafter, the light is totally reflected by the first surface D, and is transmitted through the second surface E to reach the eyes of the user via the eyepiece 82. In the straight viewing state, the user can observe the magnified image of the object in the visual line direction.

On the other hand, in the state of viewing with the optical path being deflected where the movable mirror 91 is located on the operating position, the light from the object to be observed is reflected by the fixed mirror 92 and the movable mirror 91 in the above order, and thereafter, is incident onto the objective lens 81 to reach the eyes of the user via the erecting prism 83 and the eyepiece 92. In the state of viewing with the optical path being deflected, the user, facing front, can observe the magnified image of the object at the user's hands.

By preparing a pair of the right and left optical systems configured as aforementioned, and fixing them to the eyeglass lenses in the same manner as the first embodiment, or fixing them to the eyeglass frame or the head belt via the supporting member in the same manner as the second or the third embodiment, the magnifying binoculars according to the fourth embodiment can be configured. In addition, the optical path switching unit 90 may be configured detachably to the magnifying optical system unit 80, and the movable mirror 91 may be fixed to the optical path switching unit 90.

The present disclosure relates to the subject matter contained in Japanese Patent Application No. P2005-229932, filed on Aug. 8, 2005, which is expressly incorporated herein by reference in its entirety.

What is claimed is:

1. Magnifying binoculars configured for observing a magnified image of an object, comprising:
    a frame configured to be worn by a user;
    a pair of magnifying optical system units provided for left and right eyes of the user, respectively, each of the magnifying optical system units including a magnifying optical system for observing the magnified image of the object; and
    an optical path switching unit provided on an object side of each of the magnifying optical system units, the optical path switching unit including a movable mirror and a fixed mirror,
    wherein the movable mirror is configured to be moved between an operating position on an optical path on the object side of the magnifying optical system unit and an evacuated position off the optical path, and
    wherein the fixed mirror is configured to deflect the optical path deflected by the movable mirror when the movable mirror is located on the operating position.

2. The magnifying binoculars according to claim 1,
    wherein the magnifying optical system includes an objective lens with a positive power and an eyepiece with a positive power, and
    wherein the magnifying optical system unit includes an erecting prism arranged between the objective lens and eyepiece for erecting an image formed by the objective lens.

3. The magnifying binoculars according to claim 2,
    wherein the erecting prism is configured to deflect the optical path such that the user, facing front, can observe the object at the user's hands,
    wherein the movable mirror is configured to be moved between the operating position on the optical path deflected by the erecting prism on the object side of the magnifying optical system unit and the evacuated position off the optical path, and
    wherein the fixed mirror is configured to deflect the optical path deflected by the movable mirror such that the optical path on the object side conforms to a visual line direction of the user, when the movable mirror is located on the operating position.

4. The magnifying binoculars according to claim 2,
    wherein the erecting prism is configured to erect the image such that the optical path substantially conforms between the front and rear of the erecting prism,
    wherein the movable mirror is configured to be moved between the operating position on the optical path on the object side of the magnifying optical system unit and the evacuated position off the optical path, and
    wherein the fixed mirror is configured to deflect the optical path deflected by the movable mirror such that the optical path on the object side is deflected in a predetermined direction, when the movable mirror is located on the operating position.

5. The magnifying binoculars according to claim 1,
    wherein the optical path switching unit is attached detachably to the magnifying optical system unit.

6. The magnifying binoculars according to claim 1,
    wherein the magnifying optical system unit is attached to each of left and right eyeglass lenses fixed to the frame.

7. The magnifying binoculars according to claim 1,
wherein the magnifying optical system unit is attached to the frame through a supporting member fixed to the frame.

8. The magnifying binoculars according to claim 1,
wherein the frame is configured as a head band wearable by a head of the user, and
wherein the magnifying optical system unit is attached to the head band through a supporting member fixed to the head band.

9. The magnifying binoculars according to claim 1,
wherein the optical path switching unit includes:
  a fixed frame that is fixed to the magnifying optical system unit;
  a movable frame that is attached to the fixed frame rotatably around a horizontal rotation axis, the movable frame being formed with a knob with which the user can operate the movable frame to rotate; and
  a locating system configured to set a position of the movable mirror at one of the operating position and the evacuated position, and
wherein the fixed mirror is provided at the fixed frame, and the movable mirror is provided at the movable frame.

10. The magnifying binoculars according to claim 9,
wherein the locating system is configured with an iron piece attached to one of the movable frame and the fixed frame, and a permanent magnet attached to the other.

11. Magnifying binoculars configured for observing a magnified image of an object, comprising:
an eyeglass frame;
left and right eyeglass lenses fitted in the eyeglass frame;
left and right magnifying optical system units fixed to the left and right eyeglass lenses, respectively, for magnifying and observing the object, each of the magnifying optical system units including a magnifying optical system for observing the magnified image of the object and a deflecting member configured to deflect an optical path such that a user wearing the magnifying binoculars can observe the object at the user's hands when facing front; and
an optical path switching unit provided on an object side of each of the magnifying optical system units, including a movable mirror and a fixed mirror,
wherein the movable mirror is configured to be moved between an operating position on an optical path deflected by the deflecting member on the object side of the magnifying optical system unit and an evacuated position off the optical path, and
wherein the fixed mirror is configured to deflect the optical path deflected by the movable mirror such that the optical path on the object side substantially conforms to a visual line direction of the user, when the movable mirror is located on the operating position.

12. The magnifying binoculars according to claim 11,
wherein the magnifying optical system includes an objective lens with a positive power and an eyepiece with a positive power, and
wherein the deflecting member includes a roof prism for erecting an image formed by the objective lens that is arranged between the objective lens and eyepiece.

13. Magnifying binoculars configured for observing a magnified image of an object, comprising:
a wearable frame;
a pair of magnifying optical system units, provided for left and right eyes of a user, respectively, for observing the magnified image of the object; and
an optical path switching unit provided on an object side of each of the magnifying optical system units, the optical path switching unit being configured to switch an optical path between:
  (a) a first state where the optical path is deflected such that the user, facing front, can observe the object at the user's hands; and
  (b) a second state where the optical path on the object side substantially conforms to a visual line direction of the user.

14. The magnifying binoculars according to claim 13,
wherein each of the magnifying optical system units includes a magnifying optical system configured to produce the magnified image of the object,
wherein the optical path switching unit includes a movable mirror and a fixed mirror,
wherein the movable mirror is configured to be moved between an operating position on an optical path on the object side of the magnifying optical system unit and an evacuated position off the optical path, and
wherein the fixed mirror is configured to deflect the optical path deflected by the movable mirror, when the movable mirror is located on the operating position.

15. Magnifying binoculars configured for observing a magnified image of an object, comprising:
a wearable frame;
a pair of magnifying optical system units provided for left and right eyes of the user, respectively; and
an optical path switching unit provided on an object side of each of the magnifying optical system units, the optical path switching unit being configured to switch an optical path between:
  (a) a first state where light from the object at a position off a visual line direction of the user is incident on each of the pair of magnifying optical system units; and
  (b) a second state where the light from the object at a position on the visual line direction of the user is incident on each of the pair of magnifying optical system units.

* * * * *